US006819324B2

(12) United States Patent
Emberling

(10) Patent No.: US 6,819,324 B2
(45) Date of Patent: Nov. 16, 2004

(54) MEMORY INTERLEAVING TECHNIQUE FOR TEXTURE MAPPING IN A GRAPHICS SYSTEM

(75) Inventor: Brian D. Emberling, San Mateo, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 216 days.

(21) Appl. No.: 10/094,933

(22) Filed: Mar. 11, 2002

(65) Prior Publication Data
US 2003/0169265 A1 Sep. 11, 2003

(51) Int. Cl.$^7$ .............................................. G09G 5/399
(52) U.S. Cl. ...................... 345/540; 345/531; 345/552; 345/564; 345/582
(58) Field of Search ................................. 345/501, 582, 345/587, 531, 536, 540, 552, 564

(56) References Cited

U.S. PATENT DOCUMENTS

| | | | |
|---|---|---|---|
| 5,767,858 A | | 6/1998 | Kawase et al. |
| 5,877,770 A | * | 3/1999 | Hanaoka ..................... 345/587 |
| 6,104,418 A | * | 8/2000 | Tanaka et al. ............... 345/531 |
| 6,353,438 B1 | | 3/2002 | Van Hook et al. |
| 6,542,154 B1 | * | 4/2003 | Knittel ........................ 345/427 |
| 6,549,210 B1 | * | 4/2003 | Van Hook et al. .......... 345/561 |
| 6,636,225 B2 | * | 10/2003 | Alcorn et al. ................ 345/552 |
| 6,667,744 B2 | * | 12/2003 | Buckelew et al. ........... 345/502 |
| 2002/0171672 A1 | | 11/2002 | Lavelle et al. |
| 2002/0180747 A1 | | 12/2002 | Lavelle et al. |

* cited by examiner

Primary Examiner—Ulka J. Chauhan
(74) Attorney, Agent, or Firm—Meyertons Hood Kivlin Kowert & Goetzel, P.C.; Jeffrey C. Hood

(57) ABSTRACT

A graphics system and method for storing and accessing texture maps comprising texels. The graphics system may include a graphics processor and a texture memory comprising a plurality of memory devices for storing the texture maps. The texels (or portions of the texels) may be stored in the memory devices in an interleaved fashion. The texel data is interleaved in the memory devices to guarantee that, no matter which N×M array of texels is accessed, each texel in the array is present in a different memory device or chip and hence are concurrently available. Thus the N×M array of texels may be output concurrently or simultaneously, regardless of which array is accessed, i.e., regardless of which pixel is addressed. Embodiments are also described where the memory devices output arrays of texels for at least two respective neighboring pixels, or a 3D array of texels, in parallel in response to a single read transaction. Also, the body and border portions of the texture map are stored in separate areas of memory (e.g., in different memory address spaces), but texel interleaving is still performed.

32 Claims, 13 Drawing Sheets

Texture Address Scrambling Patterns

32-Bit: 2D or 3D or
16-Bit 3D (subset=Q[0])

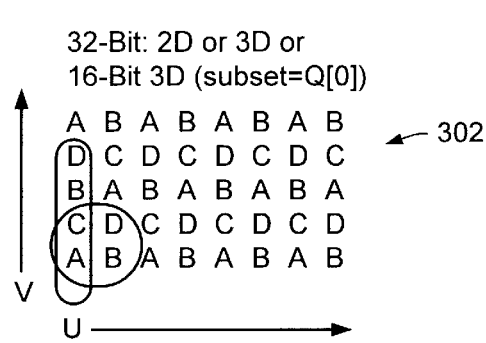

← 302

16-Bit: 2D ← 304

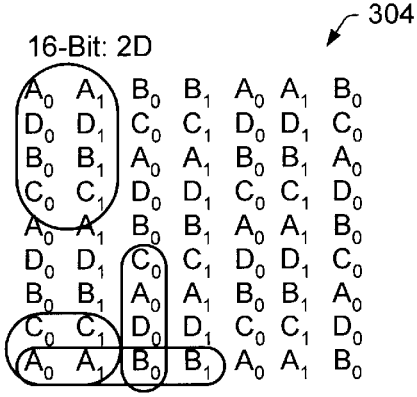

16-Bit 3D showing Subset[0]
used for alternate 3D slices

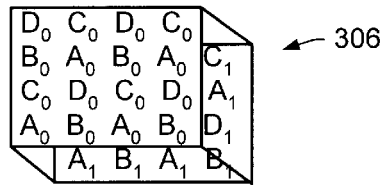

← 306

Circles show sets of texels which
can all be fetched in one cycle.

64-Bit: 2D ← 308

$A_0$ $A_0'$ $A_1$ $A_1'$ $B_0$ $B_0'$ $B_1$ $B_1'$ $A_0$
$D_0$ $D_0'$ $D_1$ $D_1'$ $C_0$ $C_0'$ $C_1$ $C_1'$ $D_0$
$B_0$ $B_0'$ $B_1$ $B_1'$ $A_0$ $A_0'$ $A_1$ $A_1'$ $B_0$
$C_0$ $C_0'$ $C_1$ $C_1'$ $D_0$ $D_0'$ $D_1$ $D_1'$ $C_0$
$A_0$ $A_0'$ $A_1$ $A_1'$ $B_0$ $B_0'$ $B_1$ $B_1'$ $A_0$

8-Bit: 3D (subset = Q[0]) ← 310

$A_0$ $A_0'$ $B_0$ $B_0'$ $A_0$ $A_0'$ $B_0$
$D_0$ $D_0'$ $C_0$ $C_0'$ $D_0$ $D_0'$ $C_0$
$B_0$ $B_0'$ $A_0$ $A_0'$ $B_0$ $B_0'$ $A_0$
$C_0$ $C_0'$ $D_0$ $D_0'$ $C_0$ $C_0'$ $D_0$
$A_0$ $A_0'$ $B_0$ $B_0'$ $A_0$ $A_0'$ $B_0$

64-Bit, RBGA16: 2D ← 312

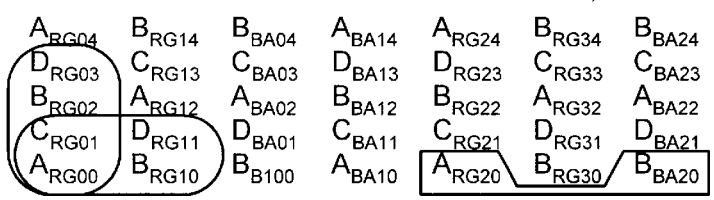

64-Bit Key:
A, B, C, D = SETS
RG = Red, Green (32 bits)
BA = Blue, Alpha
s = UV coordinates

*FIG. 9*

Alternative Representation of Interleaving In 64-Bit 2D

64-Bit: 2D
Texels in UV space:

```
03  13  23  33  43  53
02  12  22  32  42  52
01  11  21  31  41  51
00  10  20  30  40  50
```

V (arrow pointing down and up)
U ───────►

In each clock cycle, one entry can be taken from each of the 4 Sets. This shows how the 4x1 (2channel), and 2x1 (4 channel) footprints work.

Set C:

| $09_{RG}$ | $19_{BA}$ | $29_{RG}$ | $39_{BA}$ |
| $17_{RG}$ | $07_{BA}$ | $37_{RG}$ | $27_{BA}$ |
| $05_{RG}$ | $15_{BA}$ | $25_{RG}$ | $35_{BA}$ |
| $13_{RG}$ | $03_{BA}$ | $33_{RG}$ | $23_{BA}$ |
| $01_{RG}$ | $11_{BA}$ | $21_{RG}$ | $31_{BA}$ |

Set D:

| $08_{RG}$ | $18_{BA}$ | $28_{RG}$ | $38_{BA}$ |
| $07_{RG}$ | $17_{BA}$ | $27_{RG}$ | $37_{BA}$ |
| $15_{RG}$ | $05_{BA}$ | $35_{RG}$ | $25_{BA}$ |
| $03_{RG}$ | $13_{BA}$ | $23_{RG}$ | $33_{BA}$ |
| $11_{RG}$ | $01_{BA}$ | $31_{RG}$ | $21_{BA}$ |

Set A:

| $08_{RG}$ | $18_{BA}$ | $28_{RG}$ | $38_{BA}$ |
| $16_{RG}$ | $06_{BA}$ | $36_{RG}$ | $26_{BA}$ |
| $04_{RG}$ | $14_{BA}$ | $24_{RG}$ | $34_{BA}$ |
| $12_{RG}$ | $02_{BA}$ | $32_{RG}$ | $22_{BA}$ |
| $00_{RG}$ | $10_{BA}$ | $20_{RG}$ | $30_{BA}$ |

Set B:

| $18_{RG}$ | $08_{BA}$ | $38_{RG}$ | $28_{BA}$ |
| $06_{RG}$ | $16_{BA}$ | $26_{RG}$ | $36_{BA}$ |
| $14_{RG}$ | $04_{BA}$ | $34_{RG}$ | $24_{BA}$ |
| $02_{RG}$ | $12_{BA}$ | $22_{RG}$ | $32_{BA}$ |
| $10_{RG}$ | $00_{BA}$ | $30_{RG}$ | $20_{BA}$ |

Key:
A, B, C, D = SETS
RG = Red, Green (32 bits)
BA = Blue, Alpha
s = UV coordinates

*FIG. 10*

Texture Border Address Scrambling

16-Bit: 2D

$$\begin{array}{cccccccc}
B_1 & A_0 & A_1 & B_0 & B_1 & A_0 & A_1 & B_0 \\
C_1 & D_0 & D_1 & C_0 & C_1 & D_0 & D_1 & C_0 \\
A_1 & B_0 & B_1 & A_0 & A_1 & B_0 & B_1 & A_0 \\
D_1 & C_0 & C_1 & D_0 & D_1 & C_0 & C_1 & D_0 \\
B_1 & A_0 & A_1 & B_0 & B_1 & A_0 & A_1 & B_0 \\
C_1 & D_0 & D_1 & C_0 & C_1 & D_0 & D_1 & C_0 \\
\end{array}$$

Shows interleaving of borders (top, left, bottom) with body of texture.

Low-order Bit Scrambling

| Mode | Tile | Set[1] | Set[0] | SubSet# | Byte# |
|---|---|---|---|---|---|
| 2D, 64-bit | $U_4 V_3 U_3 V_2 U_2 V_1 U_1 U_0$ | V[0] | $U[0] \oplus V[1] \oplus Color$ | 0 | 0 |
| 2D, 32-bit | $U_4 V_4 U_3 V_3 U_2 V_2 U_1 V_1$ | V[0] | $U[0] \oplus V[1]$ | 0 | 0 |
| 2D, 16-bit | $U_5 V_4 U_4 V_3 U_3 V_2 U_2 V_1$ | V[0] | $U[1] \oplus V[1]$ | U[0] | 0 |
| 2D, 8-bit | $U_5 V_5 U_4 V_4 U_3 V_3 U_2 V_2$ | V[0] | $U[2] \oplus V[1]$ | U[1] | U[0] |
| 3D, 32-bit | $U_3 V_2 Q_2 U_2 V_1 Q_1 U_1 Q_0$ | V[0] | $U[0] \oplus V[1]$ | 0 | 0 |
| 3D, 16-bit | $U_3 V_3 Q_2 U_2 V_2 Q_1 U_1 V_1$ | V[0] | $U[0] \oplus V[1]$ | Q[1] | 0 |
| 3D, 8-bit | $U_3 V_3 Q_3 U_2 V_2 Q_2 V_1 Q_1$ | V[0] | $U[1] \oplus V[1]$ | Q[1] | U[0] |

*FIG. 13*

High-order Bit Scrambling

| Mode | Row[16:0] | Col 9 | Bank[1] | Bank[0] |
|---|---|---|---|---|
| 2D, 64-bit | U[11:6], V[11:6] | V[5] | V[4] | U[5] |
| 2D, 32-bit | U[11:6], V[11:7] | V[6] | V[5] | U[5] |
| 2D, 16-bit | U[11:7], V[11:7] | V[6] | V[5] | U[6] |
| 2D, 8-bit | U[11:7], V[11:8] | V[7] | V[6] | U[6] |
| 3D, 32-bit | U[9:5], V[9:4], Q[8:4] | Q[3] | V[3] | U[4] |
| 3D, 16-bit | U[9:5], V[9:5], Q[8:4] | Q[3] | V[4] | U[4] |
| 3D, 8-bit | U[9:5], V[9:5], Q[8:5] | Q[4] | V[4] | U[4] |

2-Bank SDRAMs
MIP Mapping:
Bank[0] is used for
alternating MIP levels non-MIP:
```
0 1 0 1 0 1
1 0 1 0 1 0
0 1 0 1 0 1
```

4-Bank SDRAMs
MIP Mapping:
Bank[0] is used for alternating MIP levels.
Bank[1] is used for neighboring texels as in 2 Bank SDRAM case.

non-MIP:
```
0 1 0 1 0 1
2 3 2 3 2 3
0 1 0 1 0 1
2 3 2 3 2 3
```

FIG. 16

Border SDRAM Scrambling

| Mode | Edges: Either Horiz. or Vert. | | Set[1] | Set[0] | SubSet# | Byte# |
|---|---|---|---|---|---|---|
| | Top, Bottom | Left, Right | | U[0] ⊕ V[1] ⊕ Color | | |
| 2D, 64-bit | U[11:0] | V[12:1] | V[0] | U[0] ⊕ V[1] | 0 | 0 |
| 2D, 32-bit | U[11:1] | V[12:2] | V[0] | U[1] ⊕ V[1] | 0 | 0 |
| 2D, 16-bit | U[11:2] | V[12:2] | V[0] | U[2] ⊕ V[1] | U[0] | 0 |
| 2D, 8-bit | U[11:3] | V[12:2] | V[0] | U[2] ⊕ V[1] | U[1] | U[0] |
| 3D-Mode Border Edges | | | | | | |
| 3D, 32-bit | U[11:1] | V[12:2] | V[0] | U[0] ⊕ V[1] | 0 | 0 |
| 3D, 16-bit | U[11:2] | V[12:2] | V[0] | U[0] ⊕ V[1] | U[1]** | 0 |
| 3D, 8-bit | U[11:3] | V[12:2] | V[0] | U[1] ⊕ V[1] | U[2]** | U[0] |
| 3D-Mode Border Planes | | | | | | |
| 3D, 32-bit | U[9:1] + V[9:1]*Length/2 | | V[0] | U[0] ⊕ V[1] | 0 | 0 |
| 3D, 16-bit | U[9:2] + V[9:1]*Length/2>>1 | | V[0] | U[0] ⊕ V[1] | U[1]** | 0 |
| 3D, 8-bit | U[9:3] + V[9:1]*Length/2>>2* | | V[0] | U[1] ⊕ V[1] | U[2]** | U[0] |

MEMORY INTERLEAVING TECHNIQUE FOR TEXTURE MAPPING IN A GRAPHICS SYSTEM

BACKGROUND OF THE INVENTION

1. Field of the Invention

This invention relates generally to the field of computer graphics and, more particularly, to a high performance graphics system which implements texture mapping.

2. Description of the Related Art

A computer system typically relies upon its graphics system for producing visual output on the computer screen or display device. Early graphics systems were only responsible for taking what the processor produced as output and displaying that output on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modem computer displays have many more pixels, greater color depth, and are able to display images that are more complex with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating: "draw a box at these coordinates". The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

While the number of pixels is an important factor in determining graphics system performance, another factor of equal import is the quality of the image. Various methods are used to improve the quality of images, including anti-aliasing, alpha blending, and fogging, among numerous others. While various techniques may be used to improve the appearance of computer graphics images, they also have certain limitations. In particular, they may introduce their own aberrations and are typically limited by the density of pixels displayed on the display device.

As a result, a graphics system is desired which is capable of utilizing increased performance levels to increase not only the number of pixels rendered but also the quality of the image rendered. In addition, a graphics system is desired which is capable of utilizing increases in processing power to improve graphics effects.

Therefore, a graphics system may be configured to receive a stream of vertices from a host application executing on a host computer. The vertices specify triangles in a 3D coordinate space. The triangles represent a collection of 3D objects in the 3D world coordinate space. The graphics system may operate on the triangles to generate a video stream which represents the view of a virtual camera (or virtual observer) in the 3D world coordinate space. In particular, the graphics system may compute color values for each pixel that resides within each triangle (i.e. the two-dimensional footprint of the triangle in screen space). This process of assigning color values to pixels (or samples) internal to triangles may be referred to herein as triangle rasterization.

To obtain images that are more realistic, some prior art graphics systems have implemented a process referred to as texture mapping. Thus, triangle rasterization may include the application of one or more textures. In other words, graphics system may store one or more texture maps in a texture memory and may modify the color of pixels using the one or more texture maps. For example, pixels residing internal to a given triangle comprising part of a wall may be textured with a texture map, e.g., a texture map which gives the triangle the appearance of brick material.

In a graphics application, accesses of graphics data, such as texture map data, must be performed very quickly. Therefore, one goal of a graphics system is to improve the speed and efficiency of memory accesses of texture maps from a texture memory. One common method is to use a texture memory cache to improve the speed of accesses of texture maps from the texture memory. In general, accesses to texture maps exhibit considerable spatial locality. However, reliance on cache memories and caching techniques to take advantage of this spatial locality often results in fetching more data from memory than is required. This wastes memory bandwidth. In addition, in many instances the requested array of texels cannot be accessed from the texture buffer in a single read transaction. This results in access latencies which adversely affect system performance.

Therefore, an improved system and method is desired for optimally storing texture maps in a multi-memory system to guarantee access to all of the data in a single read transaction and/or with reduced or no over-fetching.

SUMMARY OF THE INVENTION

One embodiment of the invention comprises a graphics system and method for storing and accessing texture maps. The graphics system may include a plurality of memory devices for storing the texture maps. A graphics processor may couple to the plurality of memory devices to store texture maps in the memory devices and/or access texture maps from the memory devices.

In one embodiment, a texture map comprises a plurality of texels, wherein an N×M array of texels corresponds to each pixel. For example, each N×M array of texels may comprise a 2×2 array of texels. Neighboring pixels may share one or more texels. In other words, for two neighboring pixels, their respective N×M arrays of texels may include one or more common texels. Where a 2×2 array of texels corresponds to each pixel, then in one embodiment neighboring pixels share at least two texels.

At least portions of the texels may be stored in respective ones of the plurality of memory devices, wherein neighboring (or spatially adjacent) texels are stored in separate ones of the memory devices in an interleaved fashion. Due to the interleaved nature of the storage of the texels, for each of the plurality of pixels, the plurality of memory devices are operable to output a respective N×M array of texels for a respective pixel in parallel in a single read transaction. In other words, the texel data is interleaved in the plurality of memory devices to guarantee that, no matter which N×M array of texels is accessed, each texel in the array is present in a different memory device or chip and hence are concurrently available. Thus the N×M array of texels may be output concurrently or simultaneously, regardless of which array is accessed, i.e., regardless of which pixel is addressed. The N×M array of texels may also be provided without over-fetching of non-requested texels.

When a read transaction is generated for an N×M array of texels for a respective pixel, the plurality of memory devices output the N×M array of texels for the respective pixel in parallel (concurrently) in a single cycle in response to the read transaction. Where the texels are addressed using a U,V addressing scheme, the texels in each 2×2 array of texels may have addresses U, V; U+1, V; U, V+1; and U+1, V+1. In other words, for any U,V address, a requesting device, such as the graphics processor, can access any N×M array of texels having addresses U,V; U+1, V; U, V+1; and U+1, V+1. The plurality of memory devices are operable to output a respective N×M array of texels having addresses U,V; U+1, V; U, V+1; and U+1, V+1; for a respective pixel in parallel in a single read transaction.

In one embodiment, each texel comprises a first portion and a second portion, e.g., a first half and a second half. The first and second portions of a respective texel may be stored in separate memory devices comprising a pair of memory devices to allow the respective texel to be output from the pair of memory devices in a single read transaction. In other words, the plurality of memory devices may comprise a plurality of pairs of memory devices, wherein each of the pairs of memory devices comprises a first memory device and a second memory device, and wherein each pair of memory devices is independently addressable. A first portion of each texel may be stored in a first memory device of a pair of memory devices and a second portion of each texel may be stored in a second memory device of the pair of memory devices. Each respective pair of memory devices may be operable to output a texel in response to the respective pair of memory devices receiving a single address.

For example, in a first embodiment, where each N×M array of texels comprises a 2×2 array of texels, each texel is 32 bits, the plurality of memory devices comprise 8 memory devices, and the memory devices are 16 bit memories, then each of the memory devices stores 16 bits (one half) of a respective texel. Thus, 16 bits of each texel may be stored in one memory device of a pair, and the other 16 bits may be stored in another memory device of the pair. A texel may be stored in and accessed from a respective memory device pair as described above.

In a second embodiment, for each of the plurality of pixels, the plurality of memory devices are operable to output a respective N×M array of texels for at least two respective neighboring pixels in parallel in response to a single read transaction. For example, in one exemplary embodiment, where each N×M array of texels comprises a 2×2 array of texels, each texel is 16 bits, the plurality of memory devices comprise 8 memory devices, and the memory devices are 16 bit memories, then each of the memory devices stores a respective 16 bit texel. In this exemplary embodiment, for each of the plurality of pixels, the plurality of memory devices are operable to output a respective 2×2 array of texels for each of two respective neighboring pixels in parallel in a single read transaction.

In a third embodiment, where each texture map is a 3-D texture map, an N×M×O array (3-D array) of texels corresponds to each pixel. In this embodiment, for each of the plurality of pixels, the plurality of memory devices are operable to output a respective N×M×O array of texels for a respective pixel in parallel in a single read transaction. For example, in one exemplary embodiment, where each texture map is a 3-D texture map, a 2×2×2 array of texels corresponds to each pixel, each texel is 16 bits, the plurality of memory devices comprise 8 memory devices, and the memory devices are 16 bit memories, then each of the memory devices stores a respective 16 bit texel. In this exemplary embodiment, for each of the plurality of pixels, the plurality of memory devices are operable to output a respective 2×2×2 array of texels for a respective pixel in parallel in a single read transaction.

In one embodiment, each texture map comprises a body portion and a border portion. The body portion of the texture map (without borders) may have a size that is a power of 2 in each dimension. Thus, for a 2D texture map, the width and height of the texture map is a power of 2 in size. For a 3D texture map, the width, height, and length of the texture map is a power of 2 in size. Since memory pages are a power of 2 in size, the body portion of the texture map may be efficiently stored in memory. The border portion of the texture map may be a 1 texel-wide strip around the body portion of the texture map. Since the body portion of the texture map is a power of 2 in size, the body portion plus the border portion is not a power of 2 in size. Thus, storage of the body and border portions of the texture map would be inefficient.

In one embodiment of the invention, the body and border portions of the texture map are stored in separate areas of memory (e.g., in different memory address spaces). However, the texel interleaving described above is preserved, whereby neighboring texels in the body and border portions may be stored in separate ones of the memory devices in an interleaved fashion. Thus, for respective pixels which include texels from both the body portion and border portion of the texture map, the plurality of memory devices are operable to output a respective N×M array of texels for the respective pixel in parallel in a single read transaction. In other words, the texel data is interleaved in the plurality of memory devices to guarantee that, no matter which N×M array of texels is accessed, (even if the array requires some body texels and some border texels), each texel in the array is present in a different memory device or chip and hence all of the texels in the array are concurrently available. The upper address bits of texels in the border portion may not be interleaved to allow for efficient packing.

BRIEF DESCRIPTION OF THE DRAWINGS

The foregoing, as well as other objects, features, and advantages of this invention may be more completely understood by reference to the following detailed description when read together with the accompanying drawings in which:

FIG. 9 illustrates memory interleaving using various types of texture address scrambling patterns;

FIG. 10 illustrates an alternative representation of memory interleaving in 64 bit 2D;

FIG. 13 illustrates low order bit scrambling for body address scrambling;

FIG. 14 illustrates high order bit scrambling for body address scrambling;

FIG. 15 illustrates SDRAM bank scrambling; and

FIG. 16 illustrates border SDRAM scrambling.

Figure 1:
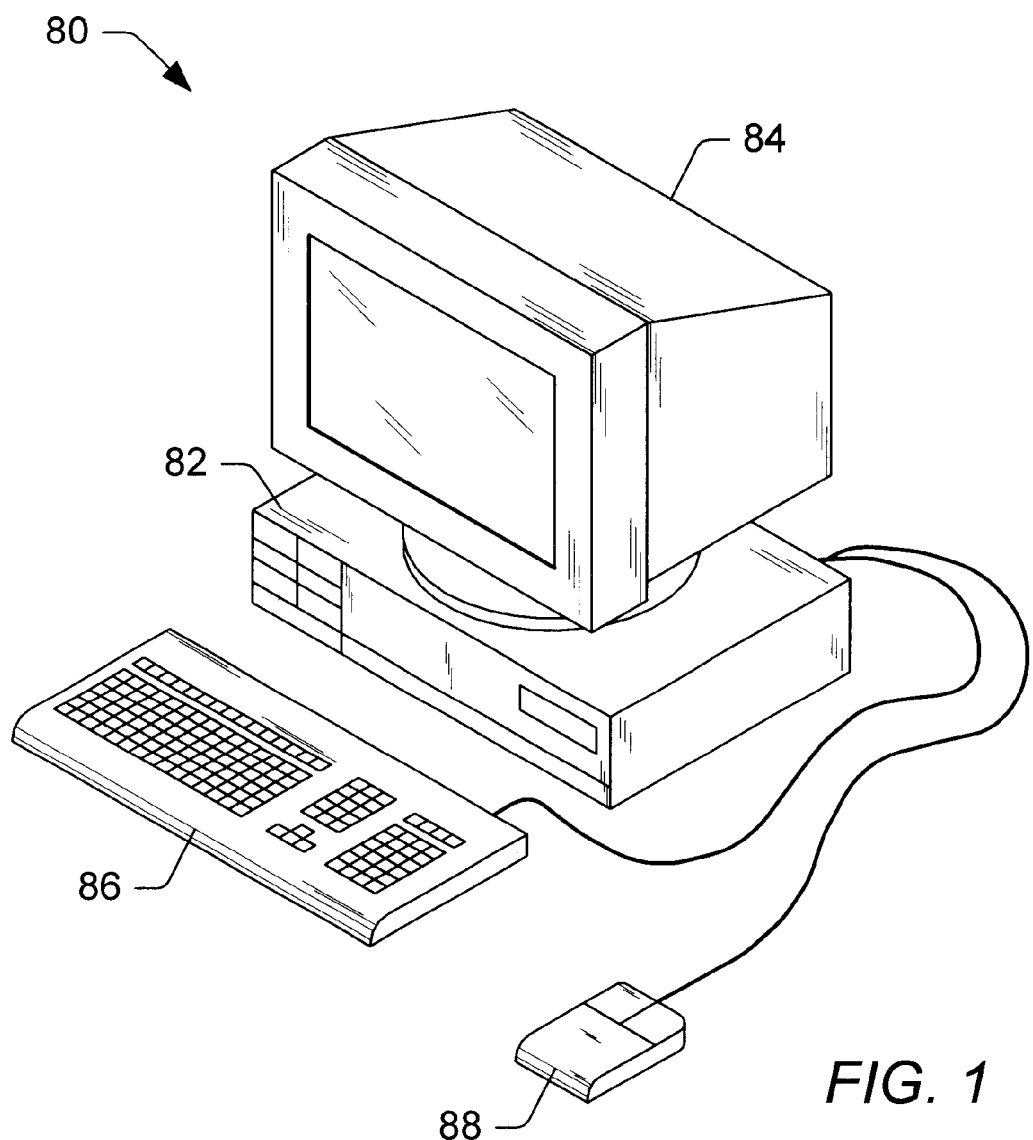
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "connected" means "directly or indirectly connected", and the term "coupled" means "directly or indirectly connected".

DETAILED DESCRIPTION OF THE EMBODIMENTS

Incorporation by Reference

U.S. Pat. No. 6,246,422 titled "Efficient Method for Storing Texture Maps in Multi-Bank Memory" issued on Jun. 12, 2001, whose inventors are Brian Emberling and Michael G. Lavelle, is hereby incorporated by reference in its entirety as though fully and completely set forth herein.

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
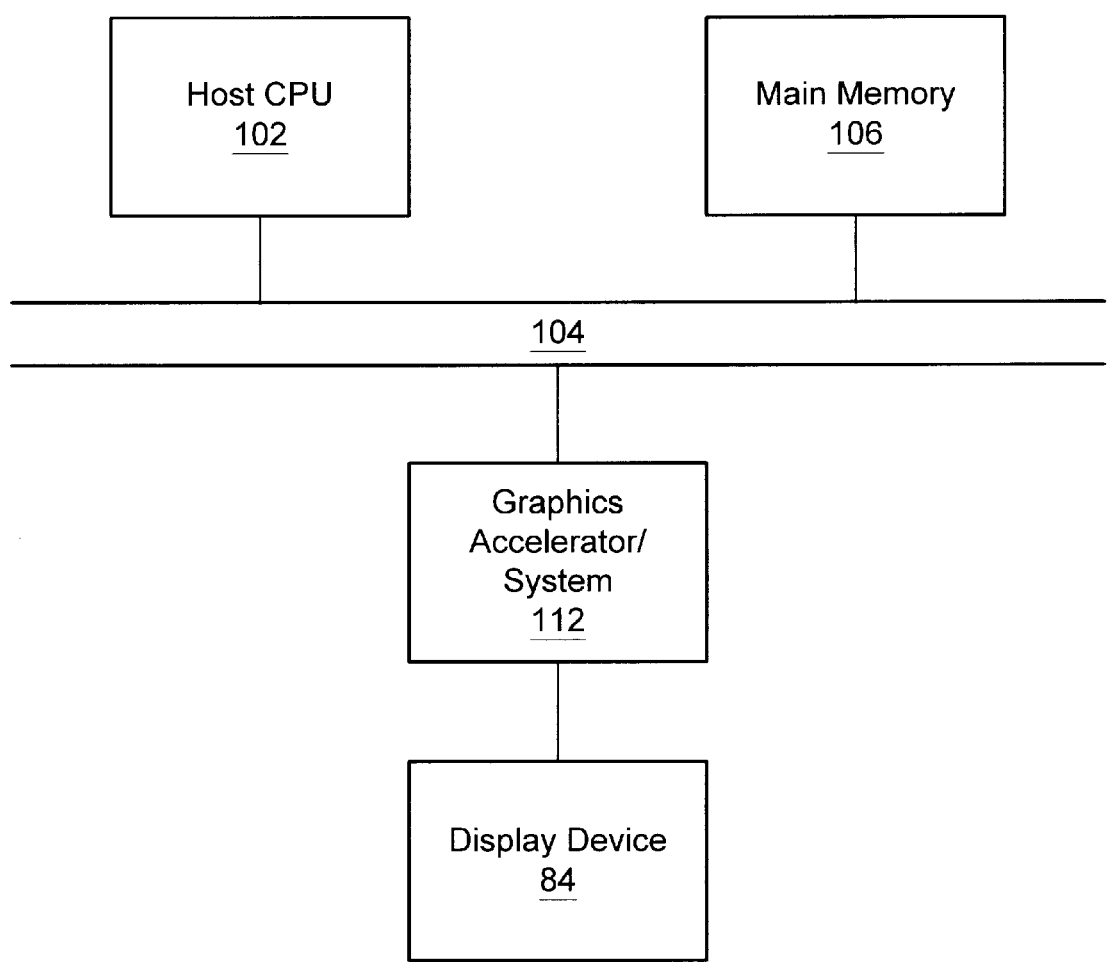
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
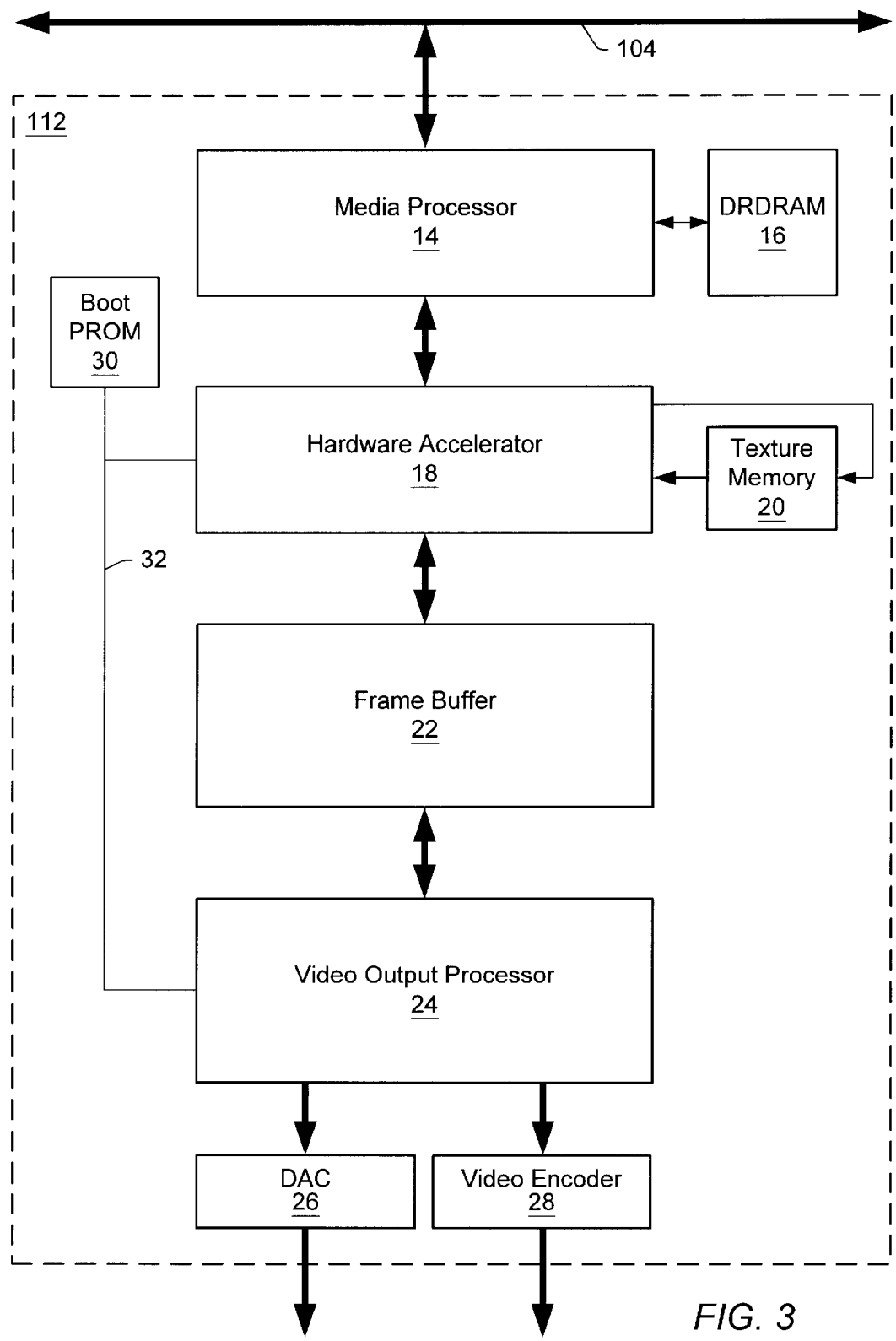
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPS, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
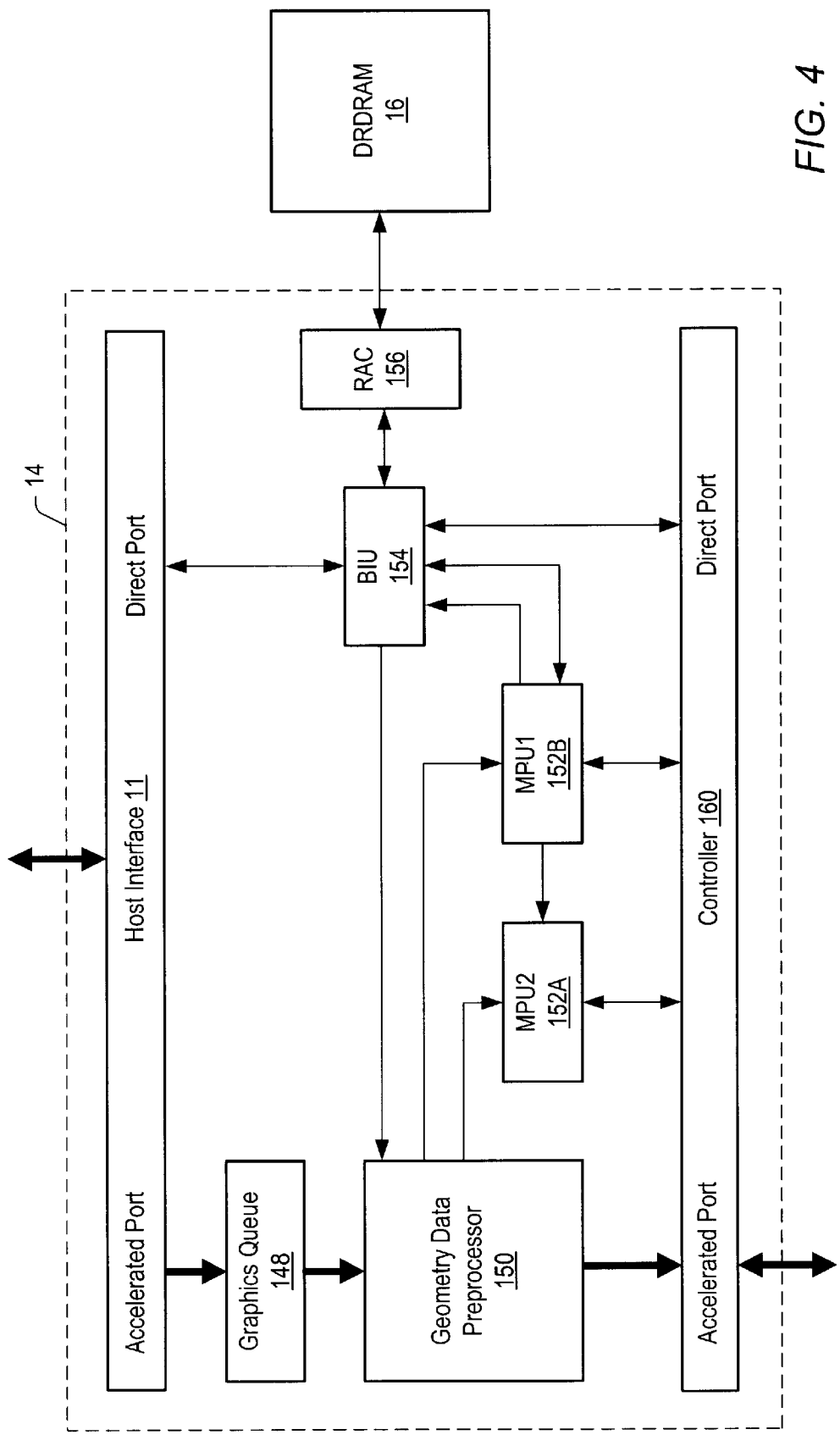
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappinga (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
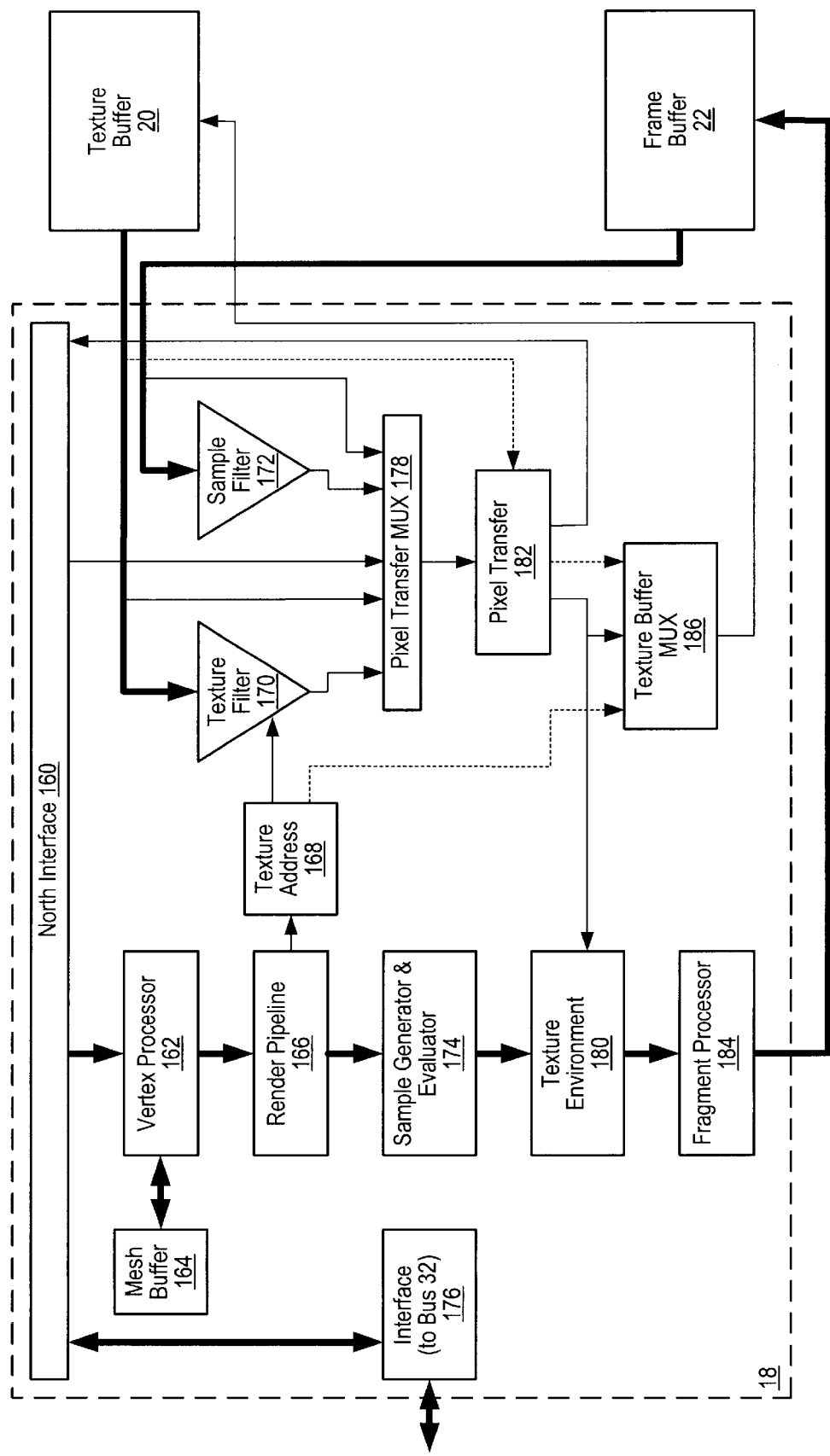
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space.

For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples may comprise points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle fall-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable. In one embodiment of the invention, the memory devices comprising the texture buffer 20 stores texture map data in an interleaved format to allow for efficient texture memory accesses.

Frame Buffer 22

Graphics system 112 may also include a frame buffer 22. In one embodiment, frame buffer 22 may include multiple 3D-RAM memory devices (e.g. 3D-RAM64 memory devices) manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and/or sample buffer.

Figure 6:
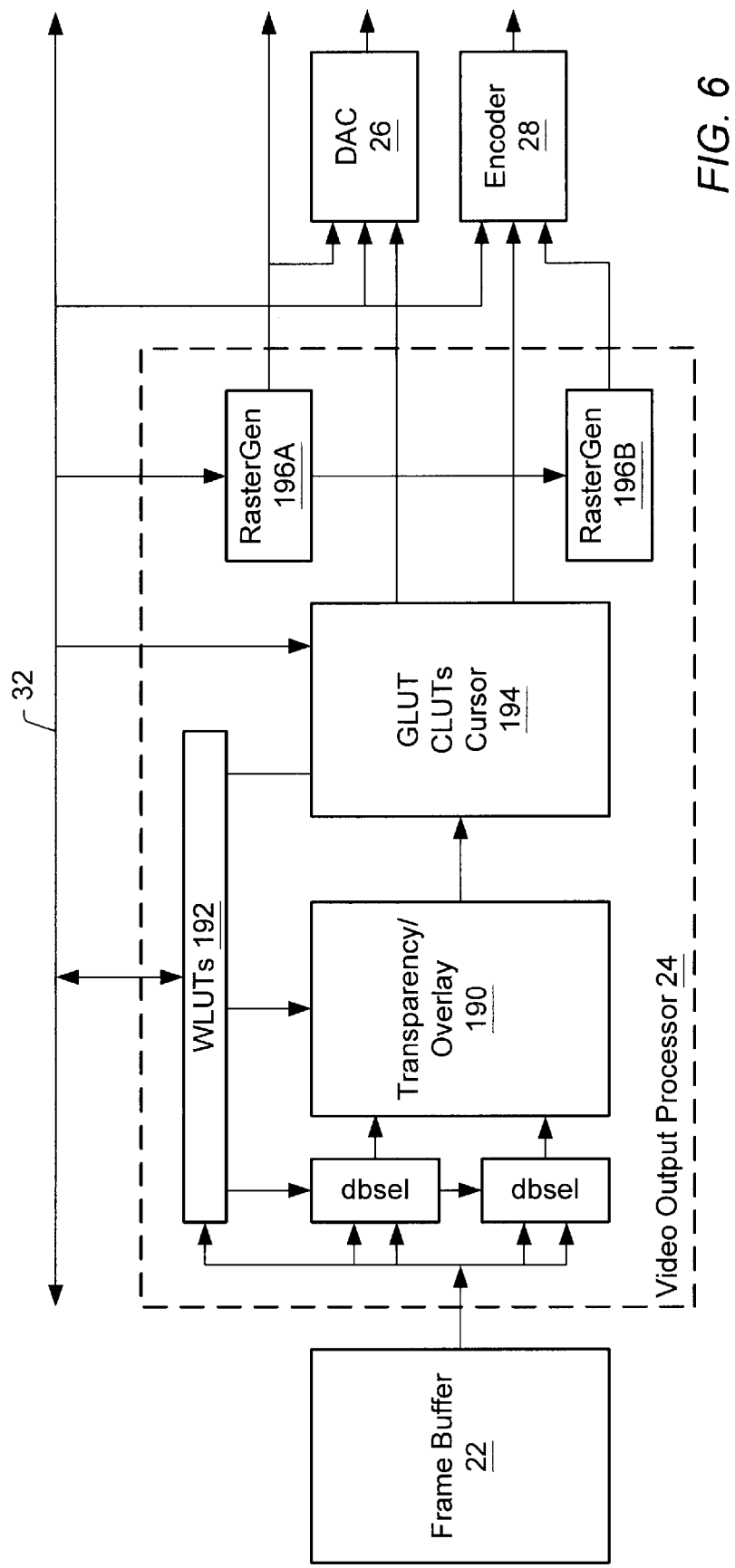
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

Figure 7:
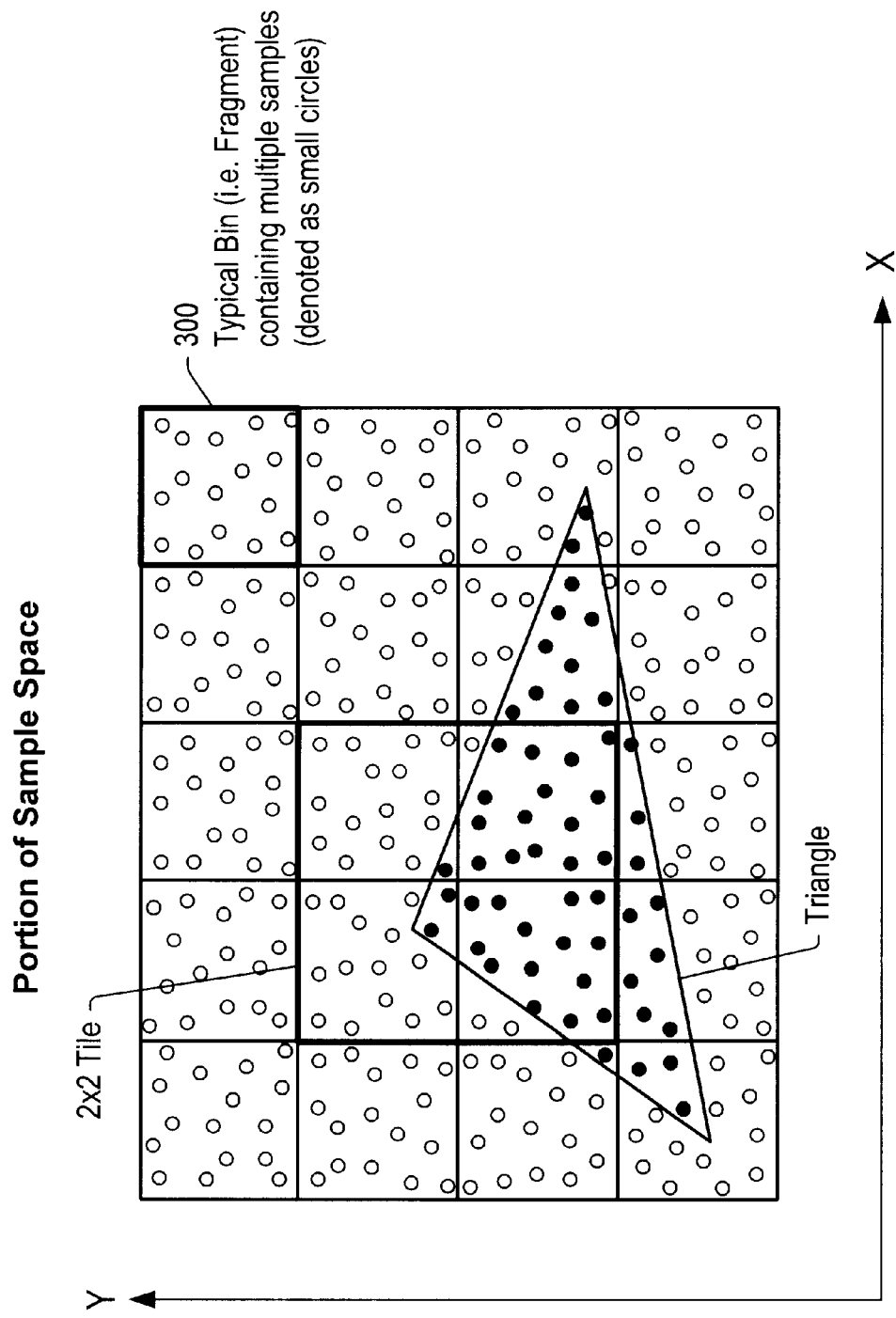
FIG. 7 illustrates rendering of samples in a polygon.

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples may be computed at positions in a two-dimensional sample space (also referred to as rendering space). The sample space may be partitioned into an array of bins (also referred to herein as fragments). The storage of samples in the sample storage area of frame buffer 22 may be organized according to bins (e.g. bin 300) as illustrated in FIG. 7. Each bin may contain one or more samples. The number of samples per bin may be a programmable parameter.

The samples may then be read from the sample storage area of frame buffer 22 and filtered by sample filter 22 to generate pixels. In one embodiment, the pixels may be stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28. In one embodiment, as discussed above, the sample filter 22 may filter respective samples to generate pixels, and the pixels may be provided as a video stream to the display without any intervening frame buffer storage, i.e., without storage of the pixels.

Figure 8:
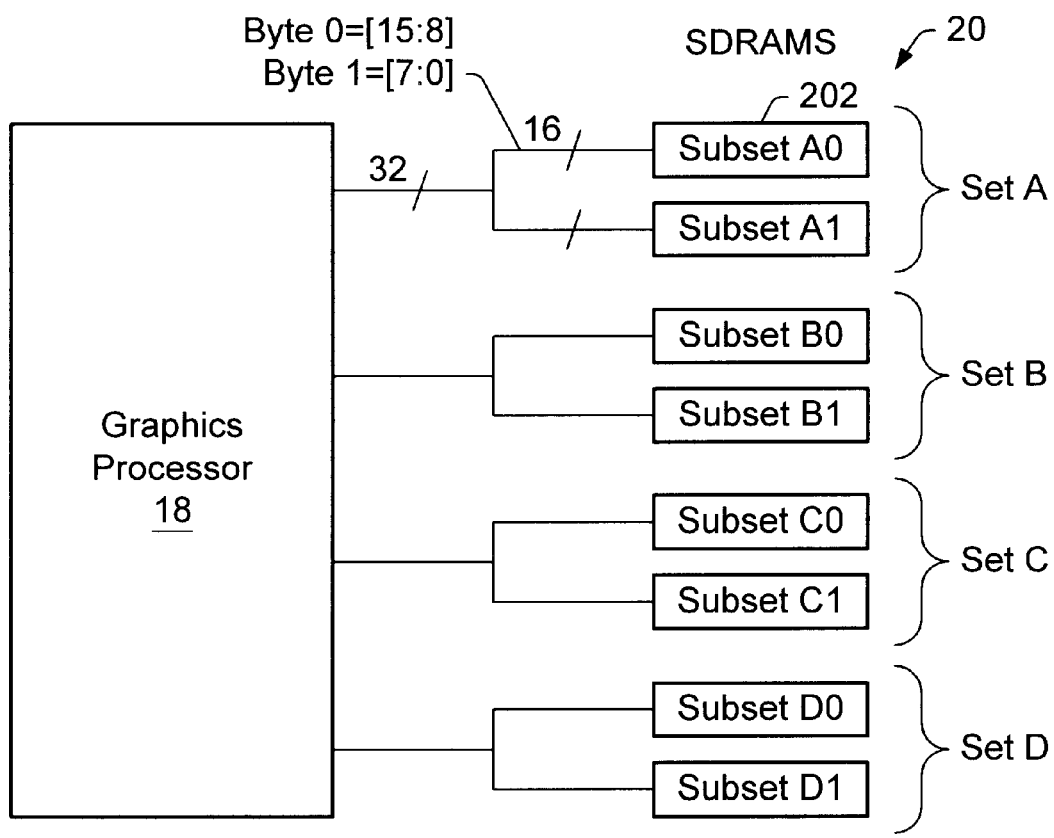
FIG. 8 illustrates a graphics processor coupled to a plurality of memory devices, wherein the memory devices store texture maps.

FIG. 8—Exemplary Graphics System

FIG. 8 illustrates an embodiment of a portion of the graphics system. As shown, graphics processor (e.g. hardware accelerator) 18 couples to a texture memory 20 comprising a plurality of memory devices 202. The memory devices 202 may comprise a plurality of pairs of memory devices 202. In the embodiment shown in FIG. 8, the system comprises 4 pairs of SDRAM memory devices 202, i.e., 8 total memory devices. The pairs of memory devices are referred to as Set A, Set B, Set C, and Set D. Each set includes a subset, e.g., Set A includes Subset A0 and Subset A1, and so forth.

The graphics processor 18 may store texture maps in the memory devices 202 and/or access texture maps from the memory devices 202. The memory devices 202 may thus be used to store texture maps used in the rendering process. Thus the memory devices 202 may comprise the texture buffer 20. The texture buffer 20 may have eight SDRAMs. In one set of embodiments, each pair of SDRAMs may be independently row and column addressable, to allow arbitrary addressing of 2×2 texture footprints. Furthermore, within each pair, the two SDRAMs may receive independent column addresses.

In one embodiment, a texture map comprises a plurality of texels, wherein an N×M array of texels corresponds to each pixel. For example, each N×M array of texels may comprise a 2×2 array of texels. Neighboring pixels may share one or more texels. In other words, for two neighboring pixels, their respective N×M arrays of texels may include one or more common texels. Where a 2×2 array of texels corresponds to each pixel, then in one embodiment neighboring pixels share at least two texels. The graphics system may include various texture modes, e.g., 2D and 3D modes, and 8, 16, 32 or 64 bit texels.

Memory Interleaving

According to one embodiment of the invention, at least portions of the texels may be stored in respective ones of the plurality of memory devices 202, wherein neighboring (or spatially adjacent) texels are stored in separate ones of the memory devices in an interleaved fashion. Due to the interleaved nature of the storage of the texels, for each of the plurality of pixels, the plurality of memory devices are operable to output a respective N×M array of texels for a respective pixel in parallel in a single read transaction. In other words, the texel data is interleaved in the plurality of memory devices to guarantee that, no matter which N×M array of texels is accessed, each texel in the array is present in a different memory device or chip 202 and hence all of the texels in the array are concurrently available. Thus the N×M array of texels may be output concurrently or simultaneously, regardless of which array is accessed, i.e., regardless of which pixel is addressed.

Therefore, for each of the plurality of pixels, the graphics processor 18 is operable to access any N ×M array of texels for any respective pixel in a single read transaction, e.g., in a single clock cycle. The access may also be performed with reduced or no over-fetching. In other words, the graphics processor 18 is operable to generate a read request for an N ×M array of texels, and as a result the plurality of memory devices 202 composing the texture buffer in one embodiment operate to output just the N ×M array of texels, without any over-fetching of unwanted texel data. In another embodiment, the plurality of memory devices 202 may be operable to output the requested N ×N ×M array of texels and also output a non-requested, but neighboring or spatially adjacent, N ×M array in a pre-fetch fashion to possibly anticipate the next request.

One embodiment of the interleaving is illustrated below, wherein A, B, C, D, a, b, c, and d are the 8 memory devices or chips, and the memory devices are grouped into 4 pairs, these being Aa, Bb, Cc, Dd. Thus, Aa refers to subsets A0 and A1 in FIG. 8, and so on.

| Aa | Bb | Cc | Dd |
|----|----|----|----|
| Cc | Dd | Aa | Bb |
| Aa | Bb | Cc | Dd |
| Cc | Dd | Aa | Bb |

One embodiment of the graphics system provides 6 address scrambling modes to accommodate all of the different texel footprints. The 6 address scrambling modes include accumulation buffer mode, two imaging modes, and 3D modes. The accumulation buffer mode treats texture memory as a linear buffer. The other modes are optimized to be able to fetch as many texels per cycle as possible. The imaging modes (bicubic and convolve) use the 2D modes and are optimized both for texturing (2×2) and for imaging (4×1 and 4×2) footprints. The 3D modes are optimized to fetch 2×2×2 in one cycle (8 and 16-bit only due to memory bandwidth).

One embodiment of the invention utilizes a texture address mapping algorithm that has been designed to meet the following requirements:

Able to read 4 texels in a 2×2 pattern in 1 cycle

Desired to be able to read 8 texels in 1 cycle: 2 of 2×2 (2D) or 2×2×2 (3D) in 8-bit or 16-bit mode.

(2D modes) Able to read 4 texels in V (i.e. V=0 to V=3; U, Q constant) for 4×4 (3×3) filter kernel. Desired to be able to read 8 (two sets of 1×4 texels) with 8- or 16-bit texels.

Desired to be able to write 64 bits per clock cycle in U major order (V,Q constant) in any scrambling mode.

Desire as few scrambling modes as possible.

FIG. 9 illustrates memory interleaving according to various texture address scrambling patterns or modes. The letters in FIG. 9 refer to the SDRAM sets shown in FIG. 8, the subscripts refer to the subset numbers, and the prime symbol (') refers to which byte of the 16-bit SDRAM bus is being used. The circles in FIG. 9 show which patterns of texels can be read in one cycle without conflict. A conflict occurs when the same symbol (e.g., B0) is used twice in a given group. Note that the 4×2 groups only work in certain circumstances (subject to alignment and tile boundary crossing).

The mode 302 (upper left in FIG. 9) is used where texels are 32 bits in 2D or 3D or where texels are 16 bits in 3D. As shown in mode 302 of FIG. 9, in 2D any 2×2 array of pixels (represented by A, B, C, and D) can be accessed concurrently in one read cycle, and in 3D any 2×2×2 array of pixels can be accessed concurrently in one read cycle.

In an exemplary embodiment of mode 302, each N×M array of texels comprises a 2×2 array of texels, each texel is 32 bits, the plurality of memory devices comprise 8 memory devices, the memory devices are 16 bit memories, and each of the memory devices stores 16 bits (one half) of a respective texel. Thus, 16 bits of each texel may be stored in one memory device of a pair, and the other 16 bits may be stored in another memory device of the pair. A texel may be stored in and accessed from each respective memory device pair. Due to the memory interleaving, any 2×2 array of texels may be accessed in a single read cycle.

The mode 304 (upper right in FIG. 9) is used where texels are 16 bits in 2D. As shown in mode 304 of FIG. 9, where the texels are only 16 bits each, then the memory interleaving can be configured such that 2 pixels worth of texture data (two 2×2's of texels) can be accessed simultaneously as long as the two pixels are relatively close or spatially adjacent (neighboring) to one another, which is common in rasterization. More generally, for each of the plurality of pixels, the plurality of memory devices are operable to output a respective N×M array of texels for at least two respective neighboring pixels in parallel in response to a single read transaction.

In an exemplary embodiment of mode 304, each N×M array of texels comprises a 2×2 array of texels, each texel is 16 bits, the plurality of memory devices comprise 8 memory devices, the memory devices are 16 bit memories, and each of the memory devices stores a respective 16 bit texel. In this exemplary embodiment, for each of the plurality of pixels, the plurality of memory devices are operable to output a respective 2×2 array of texels for each of two respective neighboring pixels in parallel in a single read transaction.

The mode 306 (middle left in FIG. 9) is used where texels are 16 bits in 3D. In mode 306 of FIG. 9, where the texel array is 3D and the texels are 16 bits each, then the memory interleaving can be configured such that any 2×2×2 array of texels can be accessed in a single cycle. More generally, in mode 306, where each texture map is a 3-D texture map, an N×M×O array (3-D array) of texels corresponds to each pixel. In this embodiment, for each of the plurality of pixels, the plurality of memory devices are operable to output a respective N×M×O array of texels for a respective pixel in parallel in a single read transaction.

In one exemplary embodiment of mode 306, each texture map is a 3-D texture map, a 2×2×2 array of texels corresponds to each pixel, each texel is 16 bits, the plurality of memory devices comprise 8 memory devices, the memory devices are 16 bit memories, and each of the memory devices stores a respective 16 bit texel. In this exemplary embodiment, for each of the plurality of pixels, the plurality of memory devices are operable to output a respective 2×2×2 array of texels for a respective pixel in parallel in a single read transaction.

The remaining modes 308, 310, and 312 are extensions of the memory interleaving described herein for different texel bit sizes for 2D and/or 3D.

FIG. 10 illustrates an alternative representation of interleaving in 64 bit 2D. In this example, in each clock cycle, one entry can be taken from each of the 4 sets. This illustrates operation of the 4×1 (2 channel) and 2×1 (4 channel) footprints.

The scrambled data from the memory devices (e.g., SDRAMs) 202 may be sent to FIFO memories and unscrambled after being read out of these FIFOs.

Thus, in various of the modes described above, when a read transaction is generated for an N×M array of texels for a respective pixel, the plurality of memory devices output the N×M array of texels for the respective pixel in parallel (concurrently) in a single cycle in response to the read transaction. Where the texels are addressed using a U,V addressing scheme, the texels in each 2×2 array of texels may have addresses U, V; U+1, V; U, V+1; and U+1, V+1. In other words, for any U,V address, a requesting device, such as the graphics processor, can access any N×M array of texels having addresses U,V; U+1, V; U, V+1; and U+1, V+1. The plurality of memory devices are operable to output a respective N×M array of texels having addresses U,V; U+1, V; U, V+1; and U+1, V+1; for a respective pixel in parallel in a single read transaction.

Texture Bodies and Borders

The texture buffer 20 (i.e., the memory devices 202) may store texels organized as "tiles". A tile is equivalent to a page of memory, and represents the range of texels which can be accessed without incurring a page miss. In general, page misses are undesirable because they negatively impact performance. In one embodiment, each texture map comprises a body portion and a border portion. The body portion of the texture map (without borders) may have a size that is a power of 2 in each dimension. Thus, for a 2D texture map, the width and height of the texture map is a power of 2 in size. For a 3D texture map, the width, height, and length of the texture map is a power of 2 in size. Since memory pages are a power of 2 in size, the body portion of the texture map may be efficiently stored in memory. The border portion of the texture map may be a 1 texel-wide strip around the body portion of the texture map. Since the body portion of the texture map is a power of 2 in size, the body portion plus the border portion is not a power of 2 in size. Thus, storage of the body and border portions of the texture map would be inefficient.

Figures 11, 12:
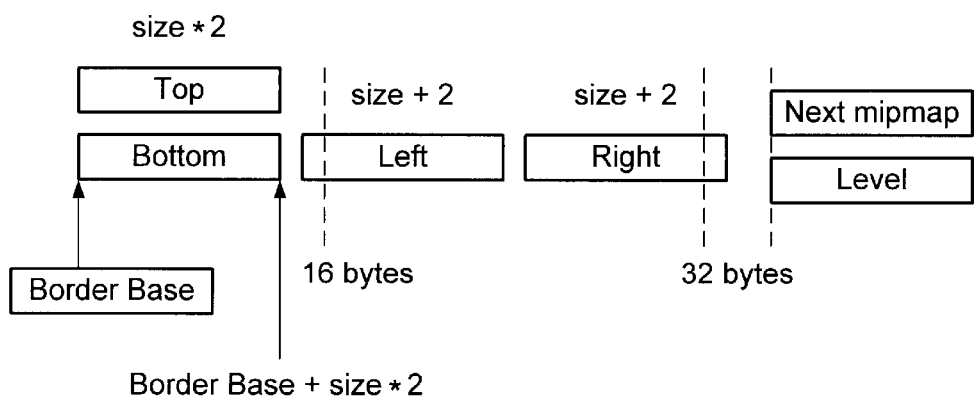
FIG. 11 illustrates memory interleaving of borders with the body of the texture.
FIG. 12 illustrates the manner in which edge borders are stored for 2D textures.

In one embodiment of the invention, the body and border portions of the texture map are stored in separate areas of memory (e.g., in different memory address spaces). However, the texel interleaving described above is preserved, whereby neighboring texels in the body and border portions may be stored in separate ones of the memory devices in an interleaved fashion. Thus, for respective pixels which include texels from both the body portion and border portion of the texture map, the plurality of memory devices are operable to output a respective N×M array of texels for the respective pixel in parallel in a single read transaction. In other words, the texel data is interleaved in the plurality of memory devices to guarantee that, no matter which N×M array of texels is accessed, (even if the array requires some body texels and some border texels), each texel in the array is present in a different memory device or chip and hence all of the texels in the array are concurrently available. The upper address bits of texels in the border portion may not be interleaved to allow for efficient packing Therefore, in one embodiment borders are interleaved with the main body of the texture. This may waste some memory in the border storage, but improves performance when image borders are used. FIG. 11 illustrates an example that shows how the borders are interleaved with 16-bit 2D textures:

Exemplary Embodiment

The following provides details of one exemplary embodiment of the present invention. It is noted that the present invention may be implemented in various different ways, as desired.

Texture Border Storage

In one embodiment, borders are stored in a separate location from the main body of the texture images, as defined by a Border Base Register. This simplifies address calculation for texels within the texture image, and allow for some performance improvement by packing neighboring texels together.

In 2D mode, the storage order is: bottom border, top border, left border, right border. To simplify addressing, all edge borders are of size=MAX (width, height, depth, 16-bytes). This may be slightly wasteful if the texture map is not square/cubic, but simplifies calculations. In 3D mode, the far border plane is stored first (r<0.0), then the near border plane (r>1.0), and then sets of bottom/top/left/right borders as in the 2D case. Note that there are (Size+2) of these sets of edge borders. For the mip map case, the above patterns repeat for each MIP level.

Base Addresses of Borders

The base address of the level 0 border is stored in the Border Base Register. The addresses of the borders for other mip levels are computed by the hardware. The base address in this register is preferably 4k-byte aligned.

In one embodiment, the borders are tightly packed. In this embodiment, however, finding the base address of a particular MIP level's border given the border base is difficult (especially in the 3D mode). Since the border data is tightly packed (no wasted memory), it may be very difficult to compute the starting address of a particular MIP level's borders. This is because in 3D mode, each border section contains 2 border planes (near and far), and Depth+2 sets of edge borders (top, bottom, left, right). The size of this set of borders is: (width*depth*2+(depth+2)*2*(width+2+height)). This coupled with the fact that width, depth and height aren't necessarily ½ of what they were on the previous level (since the texture may not be square/cubic) makes this difficult to calculate.

In another embodiment, the borders are not tightly packed. When calculating the border storage area, the main texture is assumed to be square/cubic with dimensions (MAX(width, depth, height, 16-bytes))$^3$. This simplifies the calculation, and wastes no memory for square/cubic textures. This also reduces memory waste when the textures have a relatively small aspect ratio or for large textures. The formula for the area of a particular 3D border is now: $(6n^2+12n+8)$, where n=MAX (Width, Height, Depth). To enforce alignment restrictions, borders are considered to be at least 16 bytes long.

Furthermore, as described above, borders are interleaved (scrambled) in the same way as the core texture (body portion of the texture) so that the texture memory controller won't "thrash" (multiple page or tile misses) when reading both border and core texels. This comes at the cost of taking 1–4× the storage for the vertical borders (depending on bytes per texel).

One method to calculate the Base Address of the borders for a particular Mip Level is to use a lookup table. The function takes (size and level), and returns the base address. Size=MAX (Width, Height, Depth), and Level is the MIP level which you're looking for the border address. Note that level is never greater than size. The lookup table implements the formula described above.

2D Borders

FIG. 12 illustrates the manner in which edge borders are stored for 2D textures.

The 4 edge borders are stored: bottom, top, left, right. The borders are allocated space as though they are of size=max (width,height). The corner texels belong to the left and right borders.

The border texels are low-order scrambled exactly like the body of the texture (Set, Subset, Byte). This increases performance and eases the unscrambling operation. The address bits above those fields are linear addresses.

The horizontal texture borders may only use Sets A and B for the Top and Sets C and D for the Bottom edge. This allows these edges to fully utilize memory by treating the top and bottom as though they have the same starting address and are interleaved by the sets. The address is exactly like the low order scrambling (including Set[1]=V[0]). The address range for horizontal borders is {0 . . . size-1}.

The vertical borders may not be fully packed, however. The low-order scrambling dictates that 16-bit textures only use subset 1 (wasting ½ of the memory), and 8-bit textures only use subset 1, byte 1 (wasting ¾ of memory). This loss is inconsequential for textures at least 64×64 or 32×32×32. Also note that 32-bit texels do not waste any memory.

The vertical borders include the corner texels, and thus the address range is [-1 to size]. For this reason (and to ensure correct scrambling), the left and right borders are padded with 16-bytes on each side (the V=−1 and V=size texels use part of this 16 byte padding). The last border has a 32-byte pad (instead of 16 bytes) to make the entire border set 64-byte aligned. The next mipmap level's borders start at that point.

3D Borders 3D borders are stored in the following order: far plane, near plane, Size+2 of edge borders (bottom, top, left, right). Width, Height and Depth are treated as though they are max(width, height, 16-bytes).

The near and far border planes are low-order scrambled preferably exactly like the body of the texture, and are assumed to be square. The address bits above that are set to:))

Address=($U+V$*size)*bytes-per-texel.))

The edge borders are stored preferably exactly like the 2D borders, with Size+2 sets of edge borders. The next mip map level's borders are stored immediately after the last edge border of the current level.

Body Address Scrambling

The following describes one embodiment of the body address scrambling. The address scrambling takes UVQ values and performs the memory interleaving for texels within the body of the texture map (not borders). This process is divided into two sections: the lower bits (Tile, Set, Subset and Byte), and the upper address bits (Row and Bank). The low order bits primarily determine how many texels can be fetched in one cycle, while the higher order bits determine how often Tile- or Page-misses occur. More specifically, the low-order scrambling determines physically which SDRAM (and on which half of the 16-bit bus) the texel data will be stored. This unit only processes texels which are not in the border.

The Lower address bits have a fixed scrambling pattern, depending on the Texel Size (8–64 bit), and the dimension (2D or 3D).

The Upper address bit packing is flexible. All of the UVQ bits not used in the Lower Address packing are assembled as: {UVQ}, then the result is shifted right to remove any unused bits in each of U, V and Q. For example, if the Width=64, then only U[5:0] is used and Q and V will be shifted left to fill the space which U[11:6] would have taken.

In one embodiment, the process summary is:

Swap U[msb] and Bank[0] if mipmapping enabled

Create low-order bit scrambling (7-1 mux based on mode)

Create high-order bit scrambling (7-1 mux based on mode)

Compact upper bits

XOR Bank bits as needed

The final output is a linear SDRAM address of the form:

Addr={Row[12:0], Col9, Bank[1:0], Tile[7:0], Set[1:0], Subset, Byte}, regardless of whether Col9 and Bank[1] actually exist in SDRAM.

Low Order Bit Scrambling

FIG. 13 illustrates Low-order bit scrambling to accomplish memory interleaving. FIG. 13 illustrates low order bit scrambling for various modes, i.e., FIG. 13 illustrates the process of logical to physical address conversion for various modes. The Subset#, Set[0], and Set[1] values indicate which of the 8 memories are accessed.

The color bit is only for 64-bit mode, and is 0 for the Red/Green pair, and 1 for the Blue/Alpha pair.

In one embodiment, the low order bits (Tile, Set, Subset, Byte) are not packed, in order to make scrambling easier and to ensure that the scrambling works correctly with a texture of any aspect ratio.

High Order Bit Scrambling

FIG. 14 illustrates high order bit scrambling for various modes according to one embodiment. FIG. 15 illustrates SDRAM bank scrambling. In FIG. 15, the numbers 0, 1, 2 and 3 are used to represent banks and how they relate to texel tiles (groups of neighboring texels). The high order bits are not used to implement memory interleaving as described herein, and hence are not discussed in detail. In addition, the SDRAM bank scrambling is not used in the memory interleaving, and thus is not described in detail herein.

Final Output

The final output of the body address is as follows:

Body_Addr={Row[12:0], Col9, Bank[1], Bank[0], Tile, Set, Subset, Byte}

If the SDRAM does not physically have 9 column address bits or 2 bank bits, then those bits will automatically become the LSBs of the row field. The sort unit takes the address from this unit as one linear address and divides it up into Row, column, bank, etc. based on the type of SDRAM being used. In other words, if an SDRAM only has 8 column bits, the Col9 field in Body_addr is still valid, but it represents Row[0]. Sort should use all bits in Body_addr, regardless of num_cols9 and num_banks4.

Border Offset and Scramble

The graphics system includes a unit (the Border Offset and Scramble Unit) which calculates the border offset and scramble. FIG. 15 illustrates the border memory scrambling. This unit calculates the address of a particular image border texel within a particular mipmap level, given the size of this level's texture map. The Border Base unit calculates the starting address for the borders for each mipmap level.

2D texture maps have 4 edge borders per mip level: top, bottom, left and right.

3D texture maps have 4 edge borders per slice (in Q), plus two border planes (which also have edge borders). The Detail texture map has no borders.

Edge borders are accessed via the direct port in U or V major. The direct port can read or write 2 texels at a time (8/16-bit mode), either in ascending U (for top and bottom) or in V (for left and right) edge borders.

The Border Offset and Scramble unit is similar to the Body Address Scramble, but is specially built to handle borders. This unit can only take 4 addresses per cycle. The border packing is sufficiently different from the packing in the main body of the texture map to warrant a separate unit. The reason for 4 and not 8 is: preferably do not pair texels if borders are involved, and in 3D mode (with image borders), texture memory can't be guaranteed to read all 8 texels in one cycle so the read is split into two 4-texel reads over two cycles.

To simplify storage calculation for borders, texture maps are assumed to be square, with the each dimension being: log2_length=MAX (W, H, D), where D=0 for 2D mode. This wastes some memory, but is relatively insignificant compared to the body of the texture map.

The operation of the border address scrambling is as follows:

First, calculate dimensions of the texture map at this level. In all modes, start by subtracting Level from W, H, D:

W=W−Level, H=H−Level, D=D−Level (but don't allow to go negative).

For 2D Texture Maps:

There are 4 edge borders: top, bottom, left right. The corners are owned by the Left and Right borders. The test to see which edge a pixel falls in are:

Left: U=−1
Right: U=2W
Bottom: V=−1 AND not Left or Right
Top: V==2H AND not Left or Right
log2_length=MAX (W, H)
length=2log2_length
BPT=bytes per texel (1, 2, 4 or 8)

Horizontal (top, bottom) and vertical (left, right) borders are treated separately. Horizontal borders are completely packed, and are:

size_*h*=MAX(16-bytes, Length*BPT) bytes long each.

Vertical borders own the corner texels, and are:

size_*v*=Max(16-bytes, Length*4-bytes(8/16/32) or 8-bytes(64-bit texels))

This is because vertical borders are not fully packed. Leaving them less packed allows them to be interleaved correctly with the body of the texture map.

There is some padding (16-bytes between edges) to account for the corner texels which are owned by the vertical borders. The starting address of the various edges are:

Bottom and Top: 0
Left: size_h*2+16-bytes
Right: size_h*2+size_v+32-bytes
Total size of all 4 edges: size_h*2+size_v*2+64-bytes To find the address of a particular texel, use the normal address scrambling for Set, Subset, Byte, and just U or V for the upper bits (U for Top/Bottom, V for Left/Right). Finally, add in the offset for the desired edge as shown above. V should be treated as a signed number (offset could be −1 into left and right borders). This address will then be added to the border base in a later unit.

For example, the address of a texel in the Left border in 2D, 16-bit mode is: Addr={V[12:2], V[0], U[1]Å V[1], U[0], 0}+ size_h*2+16 The add is signed, but the result should be positive (V is never lower than −1). This signed add must be handled carefully (sign-extend V[12]).

The reason the Left and Right borders are not densely packed is that the scrambling includes U[1] and U[0] in the Subset and Byte fields.

3D Texture Maps:

The 3D textures are packed in this order: Far Plane, Near Plane, Edges (top/bottom, left, right) for Far through Near planes.

The 3D border algorithm is:

Determine if this texel is in an Edge or Plane border
Find the starting address of that particular plane or edge border
Determine the address of the texel within that border
log2_length=MAX (W, H, D)
length=2log2_length
BPT bytes per texel (1, 2, 4 or 8)

There are 2 plane borders and length+2 sets of edge borders. Each plane border has a size (in bytes) of:

plane_area=Max (length2*BPT, 64-bytes), and each edge border is stored exactly like the 2D case. Plane borders are interleaved (scrambled) exactly like the body of the texture map, with the upper address bits set to:

Address=(U+V*length)*BPT.

A pixel is in a border if any of the coordinates are −1, or in U=2W, V=2H or Q=2D. A pixel is in the plane borders if Q=−1 or Q=2D, and U and V are not in borders. Otherwise, the pixel is in an edge border.

The starting addresses for the borders are:

Far Plane: 0
Near Plane: plane_area
Far Plane Edge Borders: 2*plane_area

The offsets into 3D plane and edge borders are shown in FIG. 15.

The memory used by each set of edges is:

Edge_area=2*(size_h+size_v)+64-bytes, so the starting address for a particular set of edges is:
Edge_*n*_base+(Q+1)*Edge_Area+2*Plane_area
Q can be in the range [−1 . . . Depth], and thus 1 is added to Q.

Total 3D border storage for 1 mipmap level:
2*Plane_area+(length+2)*Edge_area (from 2D equations)

The address for a particular texel is then:
the address from the scrambling table+the plane or edge offset, above.

The above describes one embodiment of the present invention. It is noted that the present invention may be implemented in various different ways, as desired.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for storing a texture map in a plurality of memory devices, wherein the texture map comprises a plurality of texels, wherein an N×M array of texels corresponds to each pixel, the method comprising:

storing at least portions of the plurality of texels in respective ones of the plurality of memory devices, wherein said storing comprises storing texels in separate ones of the memory devices in an interleaved fashion;

wherein, for each of the plurality of pixels, the plurality of memory devices are operable to output a respective N×M array of texels for a respective pixel in parallel in a single read transaction;

wherein each texture map comprises a body portion and a border portion;

the method further comprising:

storing the body portion in a first portion of memory address space in the plurality of memory devices; and storing the border portion in a second portion of memory address space in the plurality of memory devices;

wherein said storing also comprises storing texels in the body and border portions in separate ones of the memory devices in an interleaved fashion.

2. The method of claim 1, wherein each texel comprises a first portion and a second portion;

wherein the first and second portions of a respective texel are stored in separate pairs of the memory devices to allow each texel to be output from the pair of memory devices in a single read transaction.

3. The method of claim 1, wherein the plurality of memory devices comprise a plurality of pairs of memory devices, wherein each of the pairs of memory devices comprises a first memory device and a second memory device, wherein each pair of memory devices is independently addressable;

wherein said storing comprises storing a first portion of each texel in a first memory device of a pair of memory devices and storing a second portion of each texel in a second memory device of the pair of memory devices;

wherein each respective pair of memory devices is operable to output a texel in response to the respective pair of memory devices receiving a single address.

4. The method of claim 1, wherein the texels are addressed using a U,V address;

wherein texels in each N×M array of texels have addresses U, V; U+1,V; U, V+1; and U+1, V+1.

5. The method of claim 1, wherein, for any U,V address, a requesting device can access any N×M array of texels having addresses U,V; U+1, V; U, V+1; and U+1, V+1 wherein the plurality of memory devices are operable to output a respective N×M array of texels having addresses U,V; U+1, V; U+1, V+1; and U, V+1; for a respective pixel in parallel in a single read transaction.

6. The method of claim 1, wherein neighboring pixels share one or more texels.

7. The method of claim 1, wherein each N×M array of texels comprises a 2×2 array of texels;

wherein neighboring pixels share at least two texels.

8. The method of claim 1, wherein, for each of the plurality of pixels, the plurality of memory devices are operable to output a respective N×M array of texels for at least two respective neighboring pixels in parallel in a single read transaction.

9. The method of claim 1, wherein each texture map is a 3-D texture map, wherein an N×M×O array of texels corresponds to each pixel;

wherein, for each of the plurality of pixels, the plurality of memory devices are operable to output a respective N×M×O array of texels for a respective pixel in parallel in a single read transaction.

10. The method of claim 1, wherein each N×M array of texels comprises a 2×2 array of texels;

wherein the plurality of memory devices comprise 8 memory devices;

wherein each texel is 32 bits; and wherein each of the memory devices stores 16 bits of a respective texel.

11. The method of claim 1, wherein each N×M array of texels comprises a 2×2 array of texels;

wherein the plurality of memory devices comprise 8 memory devices;

wherein each texel is 16 bits; and wherein each of the memory devices stores a respective texel;

wherein, for each of the plurality of pixels, the plurality of memory devices are operable to output a respective N×M array of texels for at least two respective neighboring pixels in parallel in a single read transaction.

12. The method of claim 1, wherein each texture map is a 3-D texture map, wherein a 2×2×2 array of texels corresponds to each pixel;

wherein the plurality of memory devices comprise 8 memory devices;

wherein each texel is 16 bits; and wherein, for each of the plurality of pixels, the plurality of memory devices are operable to output a respective 2×2×2 array of texels for a respective pixel in parallel in a single read transaction.

13. The method of claim 1, wherein, for respective pixels which include texels from both the body portion and border portion of the texture map, the plurality of memory devices are operable to output a respective N×M array of texels for the respective pixel in parallel in a single read transaction.

14. The method of claim 1, wherein the body portion has a width and height that is a power of 2;

wherein the border portion is a 1 texel wide strip around the body of the texture map.

15. The method of claim 1, wherein upper address bits of texels in the border portion are not interleaved to allow for efficient packing.

16. A method for storing a texture map in a plurality of memory devices, wherein the texture map comprises a plurality of texels, the method comprising:

storing at least portions of the plurality of texels in respective ones of the plurality of memory devices;

wherein an N×M array of texels corresponds to each pixel;

wherein the texels are interleaved in the plurality of memories to allow, for each of the plurality of pixels, the plurality of memories to output a respective N×M array of texels for a pixel in parallel in a single read transaction;

wherein each texture map comprises a body portion and a border portion;

the method further comprising:
storing the body portion in a first portion of memory address space in the plurality of memory devices; and
storing the border portion in a second portion of memory address space in the plurality of memory devices;

wherein said storing also comprises storing texels in the body and border portions in separate ones of the memory devices in an interleaved fashion.

17. A method for storing a texture map in a plurality of memory devices, wherein the texture map comprises a plurality of texels, wherein an N×M array of texels corresponds to each pixel, the method comprising:

storing at least portions of the plurality of texels in respective ones of the plurality of memory devices, wherein said storing comprises storing texels in separate ones of the memory devices in an interleaved fashion;

wherein, for each of the plurality of pixels, the plurality of memory devices are operable to output a respective N×M array of texels for at least two respective neighboring pixels in parallel in a single read transaction;

wherein each texture map comprises a body portion and a border portion;

the method further comprising:
storing the body portion in a first portion of memory address space in the plurality of memory devices; and
storing the border portion in a second portion of memory address space in the plurality of memory devices;

wherein said storing also comprises storing texels in the body and border portions in separate ones of the memory devices in an interleaved fashion.

18. A method for storing a 3-D texture map in a plurality of memory devices, wherein the texture map comprises a plurality of texels, wherein an N×M×O array of texels corresponds to each pixel, the method comprising:

storing at least portions of the plurality of texels in respective ones of the plurality of memory devices, wherein said storing comprises storing texels in separate ones of the memory devices in an interleaved fashion;

wherein, for each of the plurality of pixels, the plurality of memory devices are operable to output a respective N×M×O array of texels for a respective pixel in parallel in a single read transaction;

wherein each texture map comprises a body portion and a border portion;

the method further comprising:
storing the body portion in a first portion of memory address space in the plurality of memory devices; and
storing the border portion in a second portion of memory address space in the plurality of memory devices;

wherein said storing also comprises storing texels in the body and border portions in separate ones of the memory devices in an interleaved fashion.

19. A method for accessing a texture map from a plurality of memory devices, wherein the texture map comprises a plurality of texels, wherein an N×M array of texels corresponds to each pixel, the method comprising:

storing at least portions of the plurality of texels in respective ones of the plurality of memory devices, wherein said storing comprises storing texels in separate ones of the memory devices in an interleaved fashion;

generating a read transaction for an N×M array of texels for a respective pixel;

the plurality of memory devices outputting the N×M array of texels for the respective pixel in parallel in a single cycle in response to the read transaction;

wherein each texture map comprises a body portion and a border portion;

the method further comprising:
storing the body portion in a first portion of memory address space in the plurality of memory devices; and
storing the border portion in a second portion of memory address space in the plurality of memory devices;

wherein said storing also comprises storing texels in the body and border portions in separate ones of the memory devices in an interleaved fashion.

20. The method of claim 19,
wherein the method is operable to perform said generating and said outputting for each of the plurality of pixels.

21. The method of claim 19,
wherein each texel comprises a first portion and a second portion;
wherein the first and second portions of a respective texel are stored in separate pairs of the memory devices to allow each texel to be output from the pair of memory devices in a single read transaction.

22. The method of claim 19,
wherein the texels are addressed using a U,V address;
wherein the read transaction references addresses U, V; U+1, V; U, V+1; and U+1, V+1 to access the N×M array of texels.

23. The method of claim 19,
wherein said outputting comprises the plurality of memory devices outputting a respective N×M array of texels for at least two respective neighboring pixels in parallel in the single cycle.

24. The method of claim 19,
wherein each texture map is a 3-D texture map, wherein an N×M×O array of texels corresponds to each pixel;
wherein said outputting comprises the plurality of memory devices outputting a respective N×M×O array of texels for a respective pixel in parallel in a single read transaction.

25. A graphics system, comprising:
a plurality of memory devices for storing a texture map, wherein the texture map comprises a plurality of texels, wherein an N×M array of texels corresponds to each pixel, wherein the plurality of memory devices store at least portions of the plurality of texels, wherein the plurality of memory devices store texels in separate ones of the memory devices in an interleaved fashion;

wherein, for each of the plurality of pixels, the plurality of memory devices are operable to output a respective N×M array of texels for a respective pixel in parallel in a single read transaction;

wherein each texture map comprises a body portion and a border portion;

wherein the body portion is stored in a first portion of memory address space in the plurality of memory devices;

wherein the border portion is stored in a second portion of memory address space in the plurality of memory devices;

wherein texels in the body and border portions are stored in separate ones of the memory devices in an interleaved fashion.

26. The graphics system of claim 25, wherein each texel comprises a first portion and a second portion;

wherein the first and second portions of a respective texel are stored in separate pairs of the memory devices to allow each texel to be output from the pair of memory devices in a single read transaction.

27. The graphics system of claim 25, wherein the texels are addressed using a U,V address;

wherein texels in each N×M array of texels have addresses U, V; U+1, V; U, V+1; and U+1, V+1.

28. The graphics system of claim 25, wherein, for each of the plurality of pixels, the plurality of memory devices are operable to output a respective N×M array of texels for at least two respective neighboring pixels in parallel in a single read transaction.

29. The graphics system of claim 25, wherein each texture map is a 3-D texture map, wherein an N×M×O array of texels corresponds to each pixel;

wherein, for each of the plurality of pixels, the plurality of memory devices are operable to output a respective N×M×O array of texels for a respective pixel in parallel in a single read transaction.

30. The graphics system of claim 25, further comprising:

a graphics processor coupled to the plurality of memory devices and operable to access the texture map from the plurality of memory devices and apply the texture map to geometric primitives for rendering an image.

31. The graphics system of claim 30, wherein, for each of the plurality of pixels, the graphics processor is operable to access any N×M array of texels for any respective pixel in a single read transaction.

32. The graphics system of claim 30, wherein the graphics processor is operable to request a first N×M array of texels;

wherein the plurality of memory devices are operable to provide the requested first N×M array of texels in parallel in a single read transaction without any overfetching of unrequested texels.

* * * * *

UNITED STATES PATENT AND TRADEMARK OFFICE
CERTIFICATE OF CORRECTION

PATENT NO. : 6,819,324 B2
DATED : November 16, 2004
INVENTOR(S) : Emberling

It is certified that error appears in the above-identified patent and that said Letters Patent is hereby corrected as shown below:

Column 21,
Line 63, please delete "U,V; U+1, V; U+1, V+1; AND U, V+1" and substitute -- U,V; U+1, V; U, V+1; AND U+1, V+1 --.

Signed and Sealed this

Twenty-fifth Day of January, 2005

JON W. DUDAS
*Director of the United States Patent and Trademark Office*